United States Patent
Ko

(10) Patent No.: US 6,862,046 B2
(45) Date of Patent: Mar. 1, 2005

(54) DISPLAY APPARATUS AND CONTROLLING METHOD FOR ON-SCREEN DISPLAY OF BAR CODE DATA

(75) Inventor: Kyung-Pill Ko, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 498 days.

(21) Appl. No.: 10/000,337

(22) Filed: Dec. 4, 2001

(65) Prior Publication Data
US 2002/0191108 A1 Dec. 19, 2002

(30) Foreign Application Priority Data
Jun. 13, 2001 (KR) ........................... 2001-33187

(51) Int. Cl.[7] .................. H04N 5/50; H04N 5/445
(52) U.S. Cl. ...................... 348/569; 348/563
(58) Field of Search ............... 348/569, 563, 348/564, 460, 570, 567, 584, 589, 600; 382/183; 725/60; H04N 5/50, 5/445, 9/74, 9/76

(56) References Cited

U.S. PATENT DOCUMENTS 5,523,794 A * 6/1996 Mankovitz et al. ......... 348/478
5,953,047 A * 9/1999 Nemirofsky ................ 348/460
6,615,109 B1 * 9/2003 Matsuoka et al. .......... 700/245

FOREIGN PATENT DOCUMENTS

| JP | 06-217222 | 8/1994 |
| JP | 08-23487 | 1/1996 |
| JP | 08-116560 | 5/1996 |
| JP | 08-223496 | 8/1996 |
| KR | 1994-5120 | 3/1994 |
| KR | 1997-123794 | 9/1997 |
| KR | 1999-13188 | 2/1999 |
| KR | 1999-47166 | 7/1999 |
| KR | 2000-40889 | 7/2000 |

* cited by examiner

Primary Examiner—Sherrie Hsia
(74) Attorney, Agent, or Firm—Robert E. Bushnell, Esq.

(57) ABSTRACT

A display apparatus comprises: a display part for displaying a video signal, a memory for storing predetermined bar code data; a bar code show key for selecting the bar code data stored in the memory for display; an on-screen display (OSD) part for executing an on screen display for adjusting a displaying state of the display part; and a controller for controlling the bar code data to be displayed on the display part through the on screen display part when the bar code data is selected by the bar code show key. With this configuration, a bar code is shown by means of an on screen display so that a separate bar code need not be adhered to a display apparatus, and there is no need for concern that the bar code will be worn away or vanish.

17 Claims, 2 Drawing Sheets

DISPLAY APPARATUS AND CONTROLLING METHOD FOR ON-SCREEN DISPLAY OF BAR CODE DATA

CLAIM OF PRIORITY

This application makes reference to, incorporates the same herein, and claims all benefits accruing under 35 U.S.C. § 119 from my application DISPLAY AND CONTROLLING METHOD THEREOF filed with the Korean Industrial Property Office on Jun. 13, 2001 and there duly assigned Ser. No. 33187/2001.

BACKGROUND OF THE INVENTION

1. Technical Field

The present invention relates in general to a display apparatus and a controlling method thereof, and more particularly, to a display apparatus and a controlling method thereof, in which data indicated with a bar code can be display.

2. Related Art

A bar code is a combination of thick lines, fine lines and blank spaces, through which English letters, digits or special signs can be represented so as to be easily read by optical means, and thus data is represented, collected, and read through the bar code.

The bar code is comprised of blanks positioned at leading and trailing ends of the bar code, a start line indicating a data start point and kind of the bar code, a stop line indicating a data end point, and an interpretation line positioned at an upper or a lower part of the bar code and represented by digits, English letters, and signs such as a hyphen. The bar code used in a field requiring accurate data further comprises a check digit for checking whether or not data is accurately read.

The bar code indicates data relative to goods including manufacturing nation, manufacturing company, manufacturing code number, manufacturing standard, price, and other information thereof. The data may be changed according to the kind of goods, the manufacturing company, or the kind of bar code.

Generally, a bar code is adhered to a display apparatus, the bar code indicating data on manufacturing company, manufacturing date, manufacturing model, and other information, and therefore a manufacturer utilizes the bar code when the display apparatus is in inventory management or after-sale service.

In the case of after-sale service, a service engineer repairs the display apparatus and records data on the repair service, and then obtains contents of the bar code of the display apparatus by reading the bar code with a bar-code reader. Thus, it is possible to develop a database on the basis of the service data together with the contents, such as manufacturing date, manufacturing model, and other information, of the bar code of the display apparatus, so that the data stored in the database may be used for goods development data.

However, the bar code may be worn away or may disappear due to carelessness of a user or during movement of the display apparatus, so that it is difficult to get data on the display apparatus through the bar code.

Exemplars of recent efforts in the art include Korean Patent Publication No. 1994-5120 to Jin-Won Ahn, entitled APPARATUS FOR DISPLAYING TV MANUFACTURER AND MODEL NAME, published on Mar. 16, 1994, Korean Patent Publication No. 1999-13188 to Jung-Nong Lee, entitled TELEVISION SET DISPLAYING INFORMATION REPRESENTING USING TIME AND DATA OF THE TV SET, published on Feb. 25, 1999, Korean Patent Publication No. 1999-47166 to Kyung-Sam Park, entitled APPARATUS AND METHOD OF AUTOMATICALLY ADJUSTING WHITE BALANCE IN A TV, published on Jul. 5, 1999, Korean Patent Publication No. 2000-40889 to Joong-Hyun Cho, entitled SCREEN ADJUSTING APPARATUS IN A MONITOR USING A BAR CODE, published on Jul. 5, 2000, Korean Patent Publication No. 1997-123794 to Myung-Ui Song, entitled SYSTEM AND METHOD OF AUTOMATICALLY ADJUSTING A TV SET, published on Sep. 19, 1997, Japanese Patent Publication No. 06-217222 to Hayashi, entitled TELEVISION RECEIVER, published on Aug. 5, 1994, Japanese Patent Publication No. 08-116560 to Isokawa et al., entitled INSPECTION DEVICE, published on May 7, 1996, Japanese Patent Publication No. 08-223496 to Sasaki, entitled SECRET PRODUCTION NUMBER DISPLAY DEVICE, published on Aug. 30, 1996, and Japanese Patent Publication No. 08-023487 to Sasaki, entitled ROM NAME DISPLAY DEVICE, published on Jan. 23, 1996.

While these recent efforts provide advantages, it is noted that they fail to adequately provide an efficient, convenient, and improved display apparatus and controlling method thereof.

SUMMARY OF THE INVENTION

Accordingly, the present invention has been developed while keeping in mind the above-described shortcomings and needs of the user, and an object of the present invention is to provide a display apparatus and a controlling method thereof, in which it is easy to get data entered on a bar code when the bar code may be worn away or vanished.

This and other objects of the present invention may be accomplished by the provision of a display apparatus comprising: a display part for displaying a video signal; a memory for storing predetermined bar code data; a bar code show key for selecting the bar code data stored in the memory for display; an on screen display (OSD) part for executing an on screen display for adjusting a displaying state of the display part; and a controller for controlling the bar code data to be displayed on the display part through the on screen display part when the bar code data is selected by the bar code show key.

Preferably, the bar code data is represented with a bar code. Preferably, the bar code data includes manufacturing data on at least one of a manufacturing model, a manufacturing specification, an accessories specification, and other information.

In the memory, there is also stored after-sale service data relating to at least one of occasion of service, cause of service, a solution to the cause of service or service problem, and other information, and the controller displays on the on screen display an after-sale service indicating line represented by at least one of digits, English letters, and signs, and indicating the after-sale service data when the bar code data is selected by the bar code show key.

The controller controls usage data relating to at least one of usage time and on/off times to be stored in the memory, and the bar code indicates the usage data.

According to another aspect of the present invention, the above and other objects may be also achieved by the provision of a method of controlling a display apparatus comprising a display part displaying a video signal, the method comprising the steps of: storing predetermined bar code data in a memory; selecting the bar code data for display; and displaying the bar code data stored in the memory on the display part.

In the displaying step, the display part displays manufacturing data relating to at least one of manufacturing model, manufacturing specification, accessories specification, and other information. The display part also displays after-sale service data relating to at least one of service times, cause of service, solution to the problem which caused the service, and other information, as well as usage data relating to at least one of usage time and on/off times to be stored in the memory.

To achieve these and other objects in accordance with the principles of the present invention, as embodied and broadly described, the present invention provides a display apparatus having a display part for displaying a video signal, the apparatus comprising: a memory storing predetermined bar code data; a bar code show key for selecting said bar code data to be displayed; an on screen display part executing an on screen display for adjusting a displaying state of said display part; and a controller for controlling said bar code data to be displayed on said display part through said on screen display part when said bar code data is selected by said bar code show key.

To achieve these and other objects in accordance with the principles of the present invention, as embodied and broadly described, the present invention provides a method of controlling a display apparatus comprising a display part displaying a video signal, the method comprising: storing predetermined bar code data in a memory; selecting said bar code data to be displayed; and displaying said bar code data stored in said memory on said display part.

To achieve these and other objects in accordance with the principles of the present invention, as embodied and broadly described, the present invention provides an apparatus, comprising: a memory storing bar code data; a bar code show key for selecting said bar code data to be displayed; an on screen display part activating an on screen display to adjust a display state of said on screen display part; and a controller controlling said bar code data to be displayed on said display part through said on screen display part when said bar code data is selected by said bar code show key, said bar code data being displayed as a bar code on said on screen display part, said bar code data including manufacturing data having information about at least one selected from among a manufacturing model, a manufacturing specification, and an accessories specification.

To achieve these and other objects in accordance with the principles of the present invention, as embodied and broadly described, the present invention provides a method, comprising: storing bar code data in a memory, said bar code data including predetermined manufacturing data for an apparatus; selecting said bar code data to be displayed; and in response to said selecting displaying said bar code data on a video display conveying varying visual information.

To achieve these and other objects in accordance with the principles of the present invention, as embodied and broadly described, the present invention provides a computer storage medium having stored thereon a set of instructions implementing a method, said set of instructions comprising one or more instructions for: storing bar code data in a memory of an apparatus; selecting said bar code data to be displayed; and in response to said selecting, displaying said bar code data on a video display conveying varying visual information.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
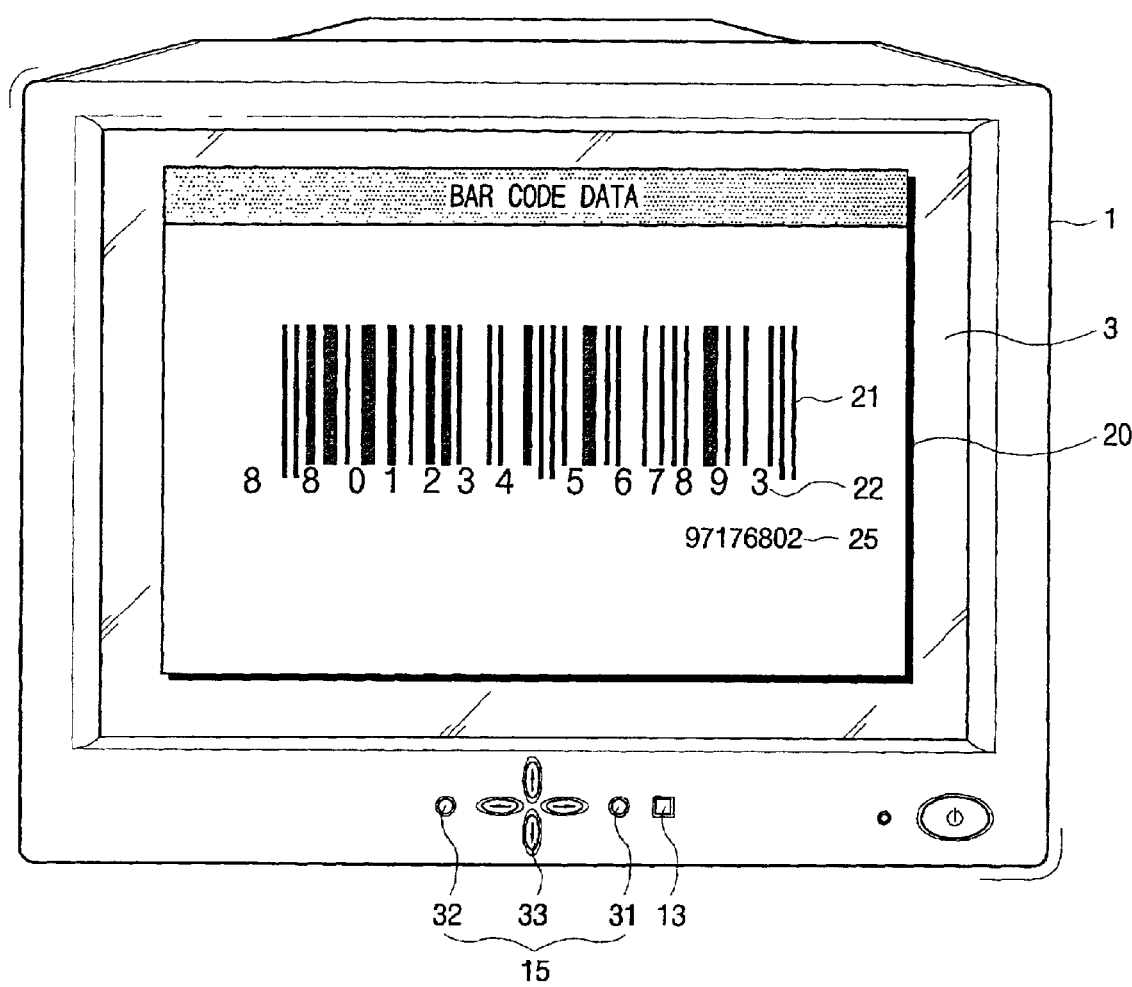
FIG. 1 is a front view of a display apparatus on which a bar code is displayed, in accordance with the principles of the present invention.

A display apparatus according to the present invention can display bar code data on a panel through on screen display (OSD). As shown in FIG. 1, the display apparatus is comprised of a main body 1 forming an external appearance, and a panel 3 on which a picture is displayed. At the lower part of the main body 1 is provided a control part 15 generating a signal executing or activating an on screen display on the panel 3 and a control signal setting up the panel 3 through the on screen display.

The control part 15 comprises a menu key 31 for executing the on screen display, an arrow keys 33 for moving a cursor in up, down, left, and right directions so as to select a menu, and a close key 32 for concluding the on screen display or moving a menu to a high menu.

Figure 2:
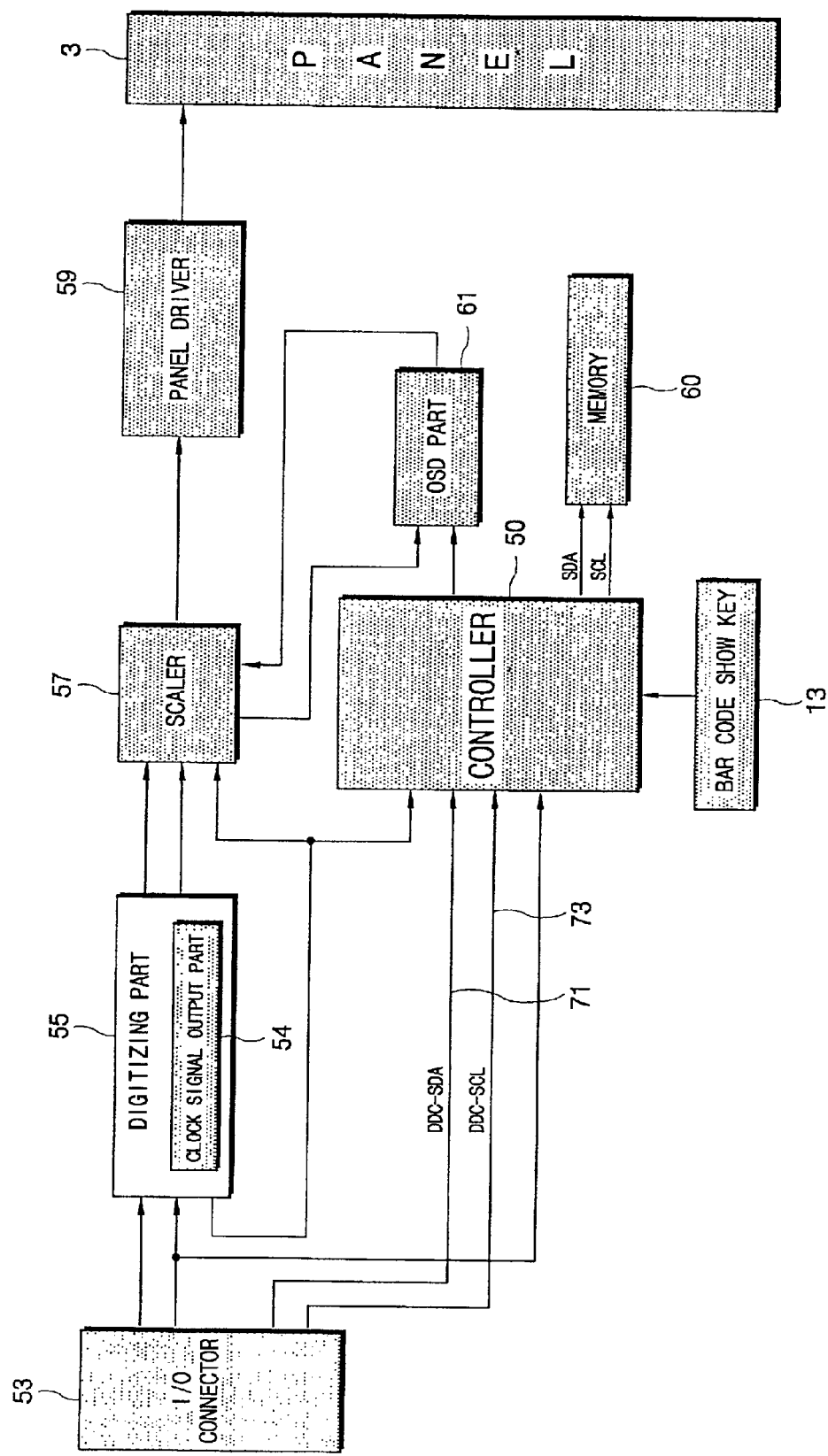
FIG. 2 is a control block diagram of the display apparatus in FIG. 1, in accordance with the principles of the present invention.

As shown in FIG. 2, a control circuit of the display apparatus comprises: a digitizing part 55 for converting red/green/blue (R/G/B) analog and horizontal/vertical (H/V) synchronous signals, which are inputted from an input/output (I/O) connector 53 connected to a computer, into digital signals; a clock signal output part 54 provided in the digitizing part 55 for outputting a clock signal; a controller 50 for detecting a resolution, a timing mode and a dot clock by reading the frequencies of the H/V synchronous signals outputted from the I/O connector 53, and for controlling the clock signal output part 54 to output a standard clock signal; a scaler 57 for receiving the R/G/B signals digitized by the digitizing part 55 and the clock signal outputted from the clock signal output part 54, and for changing the signals in size or processing the signals; and a panel driver 59 for formatting the signals from the scaler 57 to be displayed on the panel 3.

The control circuit of the display apparatus further comprises an on screen display part 61 for showing an on screen display control of the controller 50, a memory 60 for storing an extended display identification data (EDID), bar code data, usage data, and after-sale service data, and a bar code show key 13 for selecting the bar code and an after-sale service indicating line 25 to be shown. The memory 60 can be an electrically erasable programable read only memory (EEPROM).

The bar code show key 13 may be separately provided as shown in FIG. 2, or the control part 15 may be employed instead of the bar code show key 13 by combination of the keys thereof as seen in FIG. 1.

Herein, the extended display identification data, one of the data stored in the memory 60, includes data on manufacturing company, manufacturing data, manufacturer's adjustment, a user mode, and other information. The bar code data includes data on accessories, such as a microcomputer, a scaler chip, and an analog-to-digital conversion (ADC) chip, and other information together with data on manufacturing model and manufacturing specification, which are indicated through the bar code. The usage data for the display apparatus includes usage time, power on/off times, and other information, and is recorded in the bar code together with the bar code data. The after-sale service data includes data on service times, cause of service, solution to the problem causing the service, name of the service engineer, and other information, and the after-sale service indicating line 25, like an interpretation line 22 of the bar code, is represented by digits, English letters, and signs.

The extended display identification data, the bar code and the bar code data are stored in the memory 60 in a display data channel (DDC) transmission manner when the display apparatus is manufactured, and the extended display identification data is provided to a computer when power is initially turned on. Thus, in order to transmit data in the display data channel transmission manner, the controller 50 is connected to the I/O connector 53 by an SDA line for transmitting data, and an SCL line for generating a clock signal for transmitting data.

SDA and SCL in FIG. 2 mean Serial DAta (DDC data) and Serial CLock (DDC clock), respectively, and indicate pins of an I/O connector. More specifically, they indicate the 12$^{th}$ and the 15$^{th}$ pins of a D-sub connector, respectively.

The usage data such as the accumulated usage time of the display apparatus and the power on/off time thereof, are counted by the controller 50, and stored in the memory 60.

The service engineer generally has a bar-code reader and a terminal including data relating to the display apparatus. The service engineer outputs data, relating to the display apparatus requiring service, on the terminal by using the bar code reader, and provides data to a central computer system of an after-sale service center either on-line or off-line. Then, the central computer system forms the data on the display apparatus into a database on the basis of the bar code and the after-sale indicating line 25.

As shown in FIG. 1, the bar code data, the used fact data, and the after-sale service data, which are stored in the memory 60, are confirmed through the bar code 21 shown on a bar code screen 20 on the panel 3 displayed according to selection by the bar code show key 13. On the bar code screen 20, as shown via the on screen display, the bar code 21 including the interpretation line 22 represented by digits, English letters, and signs, and the after-sale service indicating line 25 represented by a bar code, English letters, digits, and signs, are displayed.

When the bar code 21 and the after-sale service indicating line 25 are displayed on the bar code screen 20 of the display apparatus, the service engineer reads the bar code 21 by using the bar-code reader, and then the portable terminal of the service engineer displays the bar code data and the used fact data indicated by the bar code 21. Further, if the service engineer inputs the after-sale service indicating line 25 to the terminal, the terminal is immediately connected to the central computer system of the after-sale service center, and then the service facts of the display apparatus from the database of the central computer system are displayed. At this time, instead of connecting the terminal to the central computer system in real time, the after-sale service data may first be stored in the terminal of the service engineer, and may then be stored to the database of the central computer system at a later time.

Hereinbelow, a process of executing the bar code screen 20 on the panel 3 will be described. Firstly, when the after-sale service engineer selects the bar code show key 13, an executing signal is transmitted to the controller 50. Then, the controller 50 controls the on screen display part 61 to show the on screen display, and the bar code 21 and the after-sale service indicating line 25 stored in the memory 60 are then displayed on the on screen display.

Thereafter, if the service engineer inputs the bar code 21 and the after-sale service indicating line 25 shown on the bar code screen 20 to the terminal by using the bar-code reader, data relating to the display apparatus, such as accessories data, usage data, after-sale service data, and other information, are displayed on the terminal. Then, the service engineer repairs the display apparatus, and inputs the failure cause and the service facts to the central computer system through on-line or off-line means so as to form a database. On the other hand, where the display apparatus does not operate because of a power supplying error, the bar code data, the usage data, and the after-sale service data, which are stored in the memory 60, can be obtained and known through the terminal.

Consequently, according to the present invention, a bar code is shown by means of an on screen display, so that a separate bar code need not be adhered to a display apparatus, and there is no need for concern that the bar code will be worn away or will vanish. Further, according to the present invention, the bar code includes all sorts of data relating to the display apparatus, such as accessories data, usage data, service data, and other information, so that it is convenient and easy for a service engineer to obtain information relating the display apparatus by using a bar-code reader and a terminal.

On the other hand, in the case of a workshop using a plurality of display apparatuses, if an on screen display for every display apparatus is executed, a specification and a state thereof are easily confirmed, so that it is convenient to inventory the display apparatus.

In the above description, the bar code show key 13 is in the form of an additional key, or a combination of the keys of the existing control part 15 so as to show the bar code data, the usage data, and after-sale service data. However, instead of using the bar code show key 13, display of the data may be selected by a new menu added to the existing on screen display in the same way as in the existing menu selection.

As described above, according to the present invention, a bar code is shown by means of an on screen display, so that a separate bar code need not be adhered to a display apparatus, and there is no need for concern that the bar code will be worn away or vanish.

FIG. 1 shows a bar code 21 and an after-sale service indicating line 25 being displayed in accordance with the principles of the present invention. Information can be displayed in a variety of different ways in accordance with the principles of the present invention. For example, data in the bar code 21 can include manufacturing data and other types of data, and data in the after-sale service indicating line 25 can include after-sale service data and other types of data. Also, when the bar code show key 13 is pressed, a first bar code 21 and a second bar code (not shown) can be displayed, with the first bar code 21 containing predetermined manufacturing information and the second bar code containing after-sale service data. Thus, the second bar code can be modified by a service technician after service is performed. The second bar code could be in lieu of the after-sale service indicating line 25, for example. In addition, there could be a third bar code (not shown) below the first and second bar codes, for example, with additional information such as usage data or other data. Also, in accordance with the principles of the present invention, the above-described bar code data could be stored in a memory in a particular electronic device, and could therefore eliminate a need to affix a bar code label onto that particular electronic device. If the particular electronic device had a display screen mounted thereon, then the bar code information could be displayed on that display screen. However, if the electronic device did not have a display screen mounted thereon, then the electronic device could be placed in communication with a display device, and then the bar code data of the particular electronic device could be displayed on the display device.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A display apparatus having a display part for displaying a video signal, the apparatus comprising:
    a memory for storing predetermined bar code data;
    a bar code show key for selecting said bar code data selected for display;
    an on screen display part for executing an on screen display adjusting a displaying state of said display part; and
    a controller for controlling said bar code data for display on said display part by means of said on screen display part when said bar code data for display is selected by means of said bar code show key.

2. The apparatus of claim 1, said bar code data being represented by a bar code.

3. The apparatus of claim 2, said bar code data including manufacturing data on at least one of a manufacturing model, a manufacturing specification, and an accessories specification.

4. The apparatus of claim 3, said memory storing after-sale service data on at least one of service time, cause of service, and solution of a problem causing the service.

5. The apparatus of claim 4, said controller displaying, on said on screen display, an after-sale service indicating line represented by at least one of digits, English letters, and signs, and indicating said after-sale service data, when said bar code data for display is selected by means of said bar code show key.

6. The apparatus of claim 5, said memory storing usage data including at least one of usage time and on/off times, said controller controlling said usage data, said bar code indicating said usage data.

7. A method of controlling a display apparatus which includes a display part for displaying a video signal, said method comprising:
    storing predetermined bar code data in a memory;
    selecting said bar code data for display; and
    displaying said bar code data selected for display on said display part;
    wherein said displaying step comprises displaying manufacturing data relating to at least one of manufacturing model, a manufacturing specification, and an accessories specification.

8. The method of claim 7, said manufacturing data being stored in said memory and being displayed on said display part.

9. The method of claim 7, said displaying step including displaying after-sale service data relating to at least one of service time, cause of service, and solution to a problem causing the service.

10. The method of claim 9, said after-sale service data being stored in said memory and being displayed on said display part.

11. The method of claim 7, said displaying step including displaying usage data relating to at least one of usage time and on/off times.

12. The method of claim 11, said usage data being stored in said memory and being displayed on said display part.

13. An apparatus, comprising:
    a memory for storing bar code data;
    a bar code show key for selecting said bar code data for display;
    an on screen display part for activating an on screen display to adjust a display state of said on screen display part; and
    a controller for controlling said bar code data selected for display on said display part by means of said on screen display part when said bar code data selected for display is selected by said bar code show key, said bar code data being displayed as a bar code on said on screen display part, said bar code data including manufacturing data containing information about at least one of a manufacturing model, a manufacturing specification, and an accessories specification.

14. The apparatus of claim 13, said on screen display part displaying at least one of usage data and after-sale service data when said bar code show key is operated.

15. A method, comprising:
    storing bar code data in a memory, said bar code data including predetermined manufacturing data for an apparatus;
    selecting said bar code data for display; and
    in response to said selecting, displaying said bar code data selected for display on a video display conveying varying visual information;
    wherein said displaying step comprises displaying at least one of usage data and after-sale service data.

16. The method of claim 15, said selecting step comprising pressing a predetermined key mounted on the apparatus.

17. A computer storage medium having stored thereon a set of instructions implementing a method, said set of instructions comprising one or more instructions for:
    storing bar code data in a memory of an apparatus;
    selecting said bar code data for display; and
    in response to said selecting, displaying said bar code data selected for display on a video display conveying varying visual information;
    wherein said bar code data includes predetermined manufacturing data for said apparatus, said displaying step comprising displaying at least one of usage data and after-sale service data for said apparatus.

* * * * *